Dec. 9, 1930.   C. UNDERLAND   1,784,558
LOADING ATTACHMENT FOR TRACTORS
Filed March 17, 1927   3 Sheets-Sheet 2

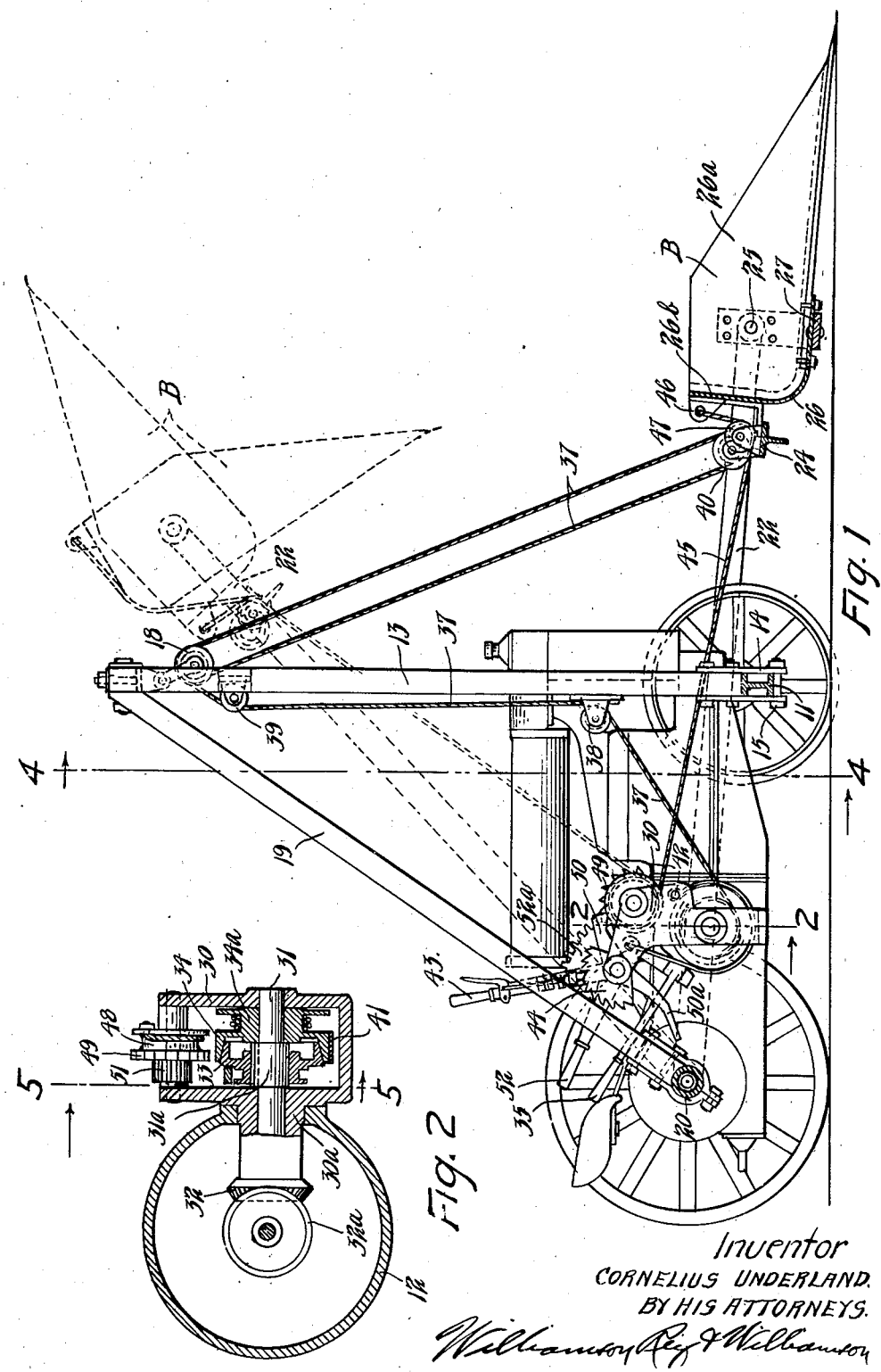

Inventor
CORNELIUS UNDERLAND.
BY HIS ATTORNEYS

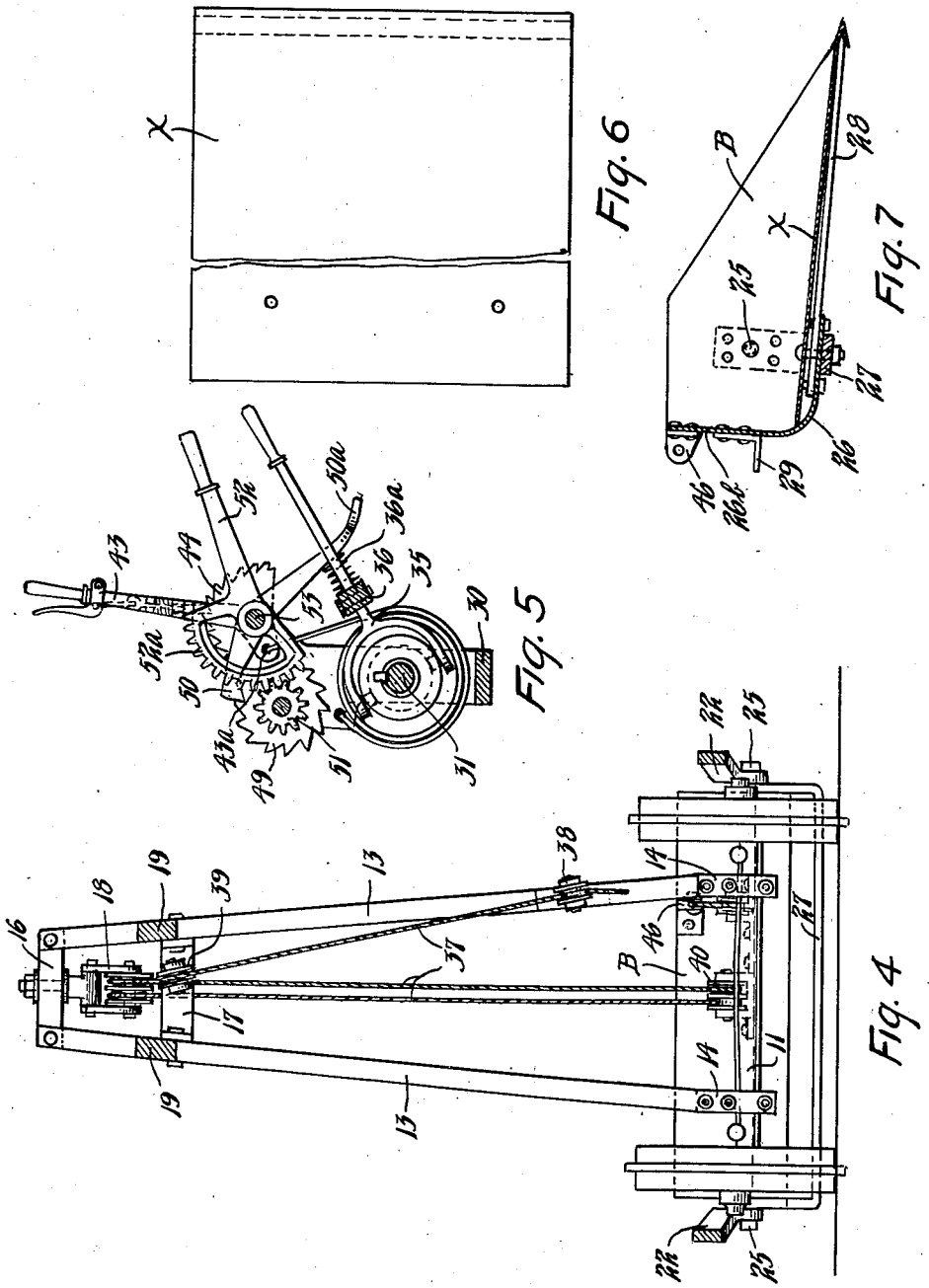

Patented Dec. 9, 1930

1,784,558

UNITED STATES PATENT OFFICE

CORNELIUS UNDERLAND, OF ELKTON, SOUTH DAKOTA

LOADING ATTACHMENT FOR TRACTORS

Application filed March 17, 1927. Serial No. 176,025.

This invention relates to scooping and loading devices and especially to loading attachments for tractors.

The main object of my invention is to provide a simple but highly efficient loading attachment which may be readily installed on standard forms of tractors commercially manufactured at this time, such as for example, the well known Fordson tractor, and which when installed in connection with a tractor will provide a device capable of efficiently scooping up and collecting material, such as manure and hay and loading the same on a wagon or stack.

A further object is to provide a loading attachment for tractors, wherein the scoop may be pushed ahead of the tractor for collecting material and may be elevated and dumped through power supplied by the power shaft of the tractor, the various operations of the device being controlled by simple and convenient means located for the convenient manipulation of the driver.

Another object is to provide in a device of the class referred to, a hoisting derrick utilized in connection with a scoop, the standard for said hoisting derrick being directly connected to the axles or axle housings of the tractor without requiring an elaborate frame, base or supporting stays.

Another object is to provide efficient means connectible to the power shaft of the tractor for elevating and loading the scoop as desired, for holding said scoop in a desired elevated position, and for dumping said scoop and re-setting said scoop in collecting position, said means being controllable from the driver's seat of said tractor.

These and other objects of the invention will be apparent from the following description made in connection with the accompanying drawings wherein like characters refer to similar parts, throughout the several views, and in which:

Fig. 1 is a side elevation of the preferred embodiment of my invention, with the elevated position of some parts being shown in dotted lines;

Fig. 2 is a vertical section taken on the line 2—2 of Fig. 1;

Fig. 4 is a vertical section taken on the line 4—4 of Fig. 1;

Fig. 5 is a vertical section showing the control mechanism for the operating means;

Fig. 6 is a plan view of an attachment for the loading scoop; and

Fig. 7 is a vertical longitudinal section of the loading scoop with said attachment thereon.

Figure 3:
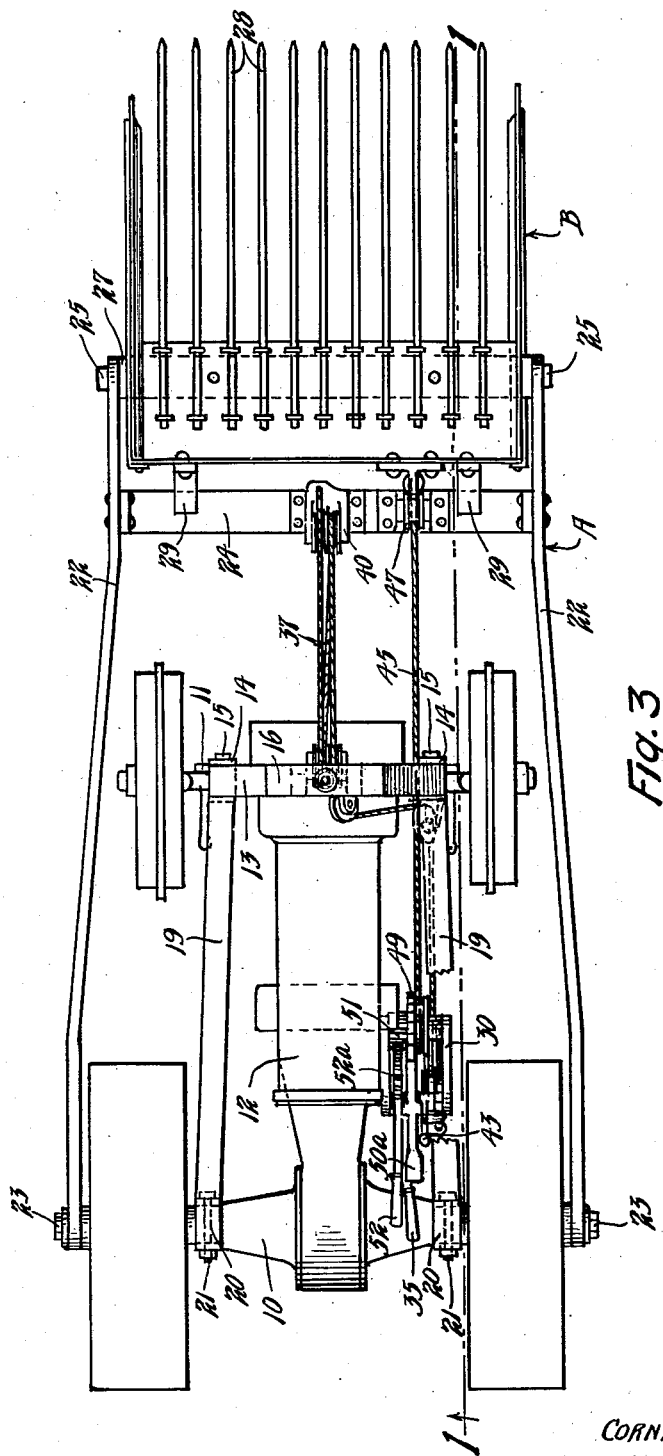
Fig. 3 is a plan view of the device illustrated in Fig. 1.

In the drawings a tractor of the Fordson type is illustrated having the rear axle housing 10, the front axle 11, and the gear and driving shaft casing 12.

A suitable standard is provided for my loader comprising a pair of slightly inclined upright supports 13 having their lower ends clamped securely to the end portions of the front axle 11 in any suitable manner, such as by the clamping plates 14 and nutted bolts 15. The upper ends of uprights 13 are secured together in spaced relation by means of the short beams 16 and 17 respectively, and a double sheave pulley 18 is suspended from the top beam 16, the purpose of which will later be described. A pair of heavy inclined braces 19 are provided for the standard secured at their upper ends to the upper ends of uprights 13 and securely clamped at their lower ends to the inner portions of rear axle housing 10 adjacent the rear wheels of the tractor. Clamping means of any suitable type may be supplied, such as the clamping straps 20 and bolts 21. It will be seen that the standard above described straddles the body of the tractor and is supported from and secured to the rear axle housing and the front axle without requiring a base or frame.

A relatively large swingable frame designated as an entirety by the letter A extends about the sides and front of the tractor comprising a pair of elongated spaced arms 22 pivoted at their rear ends to extension bolts 23, which bolts may be threadedly secured to the hubs of the rear wheels. The front ends of arms 22 are rigidly secured together by means of a transverse bar 24, said bar being disposed sufficiently forward of the front end of the tractor to permit the swingable frame to be raised or lowered without interference with the tractor or with the standard. Bar 24 may be secured to arms 22 in any suitable manner, and as shown has upturned ends which are bolted to the inner sides of said arms.

A loading scoop, designated as an entirety by the letter B is journaled between the free outer ends of arms 22 on trunnions 25. This loading scoop may be of any suitable form, but preferably comprises a concave body 26 having inclined sides 26a and a substantially vertical back 26b, said body being reinforced by means of a transverse U-shaped strap 27 secured to the bottom and sides of said scoop and carrying said trunnions 25. The corners of said body 26 may be reinforced with suitable angle iron or other means and a plurality of parallel spaced tines 28 are secured to the bottom portion of the body extending substantially parallel therewith in position to collect material. If desired, the tines may be covered by a sheet metal plate X, shown in Figs. 6 and 7, having a folded forward edge adapted to engage the points of tines 28. It will be noticed that scoop B is pivoted adjacent the rear wall of body 26, the axis of pivoting being disposed slightly eccentric to and rearwardly of the center of gravity of said scoop. Stop angles 29 are rigidly affixed to the rear wall of scoop B in position to contact the upper surface of bar 24 to limit upward swinging movement of said scoop to substantially the horizontal.

For elevating swingable frame A suitable winch or windlass is driven from the power take off of the tractor. This mechanism includes a frame or bracket 30 of U-shaped cross section having a laterally projecting stud portion 30a, which is inserted in the recess in the gear and driving shaft casing, which in Fordson tractors receives the usual power take off shaft. A relatively small power shaft 31 is journaled in the sides and stud portion of frame 30 having at its inner end the beveled gear 32 in mesh with a beveled gear 32a of the driving shaft of the tractor. Shaft 31 has an enlarged central portion 31a to which a male clutch member 33 is splined. A female clutch member 34 is loosely pivoted on the outer portion of shaft 31 in position to be engaged by slidable clutch member 33 and carries rigidly with it or formed integral therewith the winding drum 34a. A suitable shipper fork 35 is provided for operating the winding drum clutch just described, the handle of said shipper fork being pivoted in a bar 36 rigidly secured with frame 30 for lateral movement of said handle relatively to the tractor.

A cable or other flexible member 37 is secured at one end to winding drum 34a, passes beneath a guide pulley 38 mounted on one of the uprights 13 and over a second guide pulley 39 mounted on beam 17 and over one of the sheaves of pulley 18 carried by upper beam 16. Flexible member 37 is passed about a sheave of pulley 40 mounted on the upper side of bar 24, then about the second sheave on pulley 18 and has its forward end secured to the frame of pulley 40 or to bar 24.

The outer periphery of female clutch member 34 constitutes a brake drum, which may be engaged by the brake band 41, said brake band having one end secured to a pin 42 carried by frame 30 and having its other end attached to a bell crank arm 43a of brake lever 43, said brake lever being provided with a stationary toothed segment 44 adapted to be engaged by the usual projectable pawl.

Mechanism for dumping scoop B and returning said scoop to collecting position is provided in the form of a cable or flexible member 45 secured at one end to a lug 46 carried by the back wall 26b of scoop B, passed beneath guide sheave 47 mounted on bar 24 and having its rear end secured to a winding drum 48 journaled between the sides of the upper portion of frame 30. Winding drum 48 is formed integral with or rigidly connected to a ratchet wheel 49, said ratchet wheel having engagement with a relatively large pawl 50, which pawl is pivoted in frame 30 and has a pedal portion 50a conveniently disposed for the manipulation of the driver. A coiled spring 36a is disposed between pedal 50a and bar 36 adapted to yieldingly hold pawl 50 in engagement with ratchet wheel 40. Winding drum 48 and ratchet 49 are rigidly connected or formed integral with a pinion 51, said pinion having engagement with a gear segment 52a, which is carried at the working end of a lever 52 fulcrumed on a shaft 53, said shaft being mounted between the spaced sides of frame 30. It will be noticed that brake lever 43, pedal 50a, as well as lever 42 are all fulcrumed on the common shaft 53. It will also be noticed that gear segment 52a is of considerably greater radius than pinion 51.

*Operation*

The operation of my loading attachment may be briefly summarized as follows:

Assuming swingable frame 8 is disposed in substantially horizontal position with scoop B in collecting position, as shown in Fig. 1, to collect material such as manure or hay, it is only necessary to drive the tractor over the field or ground. Scoop B is pushed ahead of the tractor, collecting material thereon. If finely divided material is desired to be collected, the sheet metal plate 9 may be utilized in connection with the tines, while for material, such as hay and manure the tines are usually better adapted for collecting. The driver will be able to ascertain the amount of material in the scoop from the driver's seat and when the scoop is filled will head the tractor for the wagon, truck or stack on which he desires to dump said material. As the tractor is approaching the stack, shipper fork 35 will be thrown laterally of the machine in an outward direction, thereby throwing into engagement clutch members 33 and 34, which, of course, connects winding drum 34a with the power take off shaft 31. Thus, frame A will be slowly elevated into the position shown in dotted lines in Fig. 1 with the scoop disposed in substantial alinement with the arms 22. Swingable frame A may be held in said position by throwing shipper fork 35 to the left by means of the operating handle and setting the brake 41 by means of lever 43. When the tractor has been manipulated, to position scoop B in proper position for dumping, pedal 50a may be depressed, whereby gravity will cause said scoop to swing downwardly dropping its load. The depression of pedal 50a, as best shown in Fig. 5, releases the pawl 50 from engagement with ratchet wheel 49, thereby permitting scoop B to swing on its trunnions, said axis being disposed considerably rearwardly of its center of gravity when loaded.

Obviously, when scoop B is dumped lever 52 will be thrown forwardly because of the engagement between pinion 51 and segment gear 52a. To return the scoop to normal collecting position it is only necessary to pull lever 52 back to rearward position, the gear ratio between segment 52a and pinion 51 causing said pinion 51 to revolve a sufficient number of times to wind cable 47 on drum 48, bringing scoop B back to normal position with stop angles 29 disposed against and above the bar 24. To lower the swingable frame 22 the brake may be gradually released until the arm is lowered by gravity to a desired position.

It will be seen that the several control elements, including the operating lever for shipper fork 35, the release pedal 50a, brake lever 43, and lever 52 for swinging scoop B back to collecting position, are all disposed adjacent the driver's seat of the tractor and may be conveniently manipulated by the driver. Lever 52 is, of course, only utilized to return the scoop to normal position, while the dumping is accomplished by merely releasing pawl 50 from engagement with ratchet wheel 49. Frame A swings free of the tractor and has its outer end carrying scoop B disposed in convenient position for collecting material and for also dumping a load upon a truck, wagon or stack.

It will be seen that my attachment can be conveniently and easily attached to standard types of tractors without reorganizing or reconstructing the tractor. The standard utilized for the hoisting derrick may be set up from the rear axle housing and front axle of the tractor without setting up an elaborate frame or base or tie rods, etc. The swingable frame is pivoted to the hubs of the rear wheels. The operating mechanism mounted in the frame 30 may be quickly substituted for the ordinary power take off shaft utilized in most standard forms of tractors, and will be secured rigidly to the gear and shaft casing.

It will, of course, be understood that various changes may be made in the form, details, arrangement and proportions of the parts without departing from the scope of the invention.

What is claimed is:

A loading attachment for tractors comprising a swingable frame pivoted to said tractor on a horizontal axis, means for raising and lowering said frame, a collecting scoop pivoted to the free end of said frame on a horizontal axis extending slightly eccentric and inwardly of the center of gravity of said scoop when said scoop is loaded, a winding drum mounted on said tractor having its axis disposed adjacent the axis of said frame, a flexible member connecting said winding drum with a point disposed eccentrically of the axis of said scoop, a lever carrying a gear segment in mesh with a gear connected with said winding drum whereby said scoop may be swung to loading position and a pawl engageable with means on said drum for retaining said scoop in loaded position and for releasing said scoop to permit the same to dump by gravity when loaded.

In testimony whereof I affix my signature.

CORNELIUS UNDERLAND.